July 21, 1936.  H. SOMERVELL  2,048,202
TRUCK
Filed June 30, 1932   2 Sheets-Sheet 1
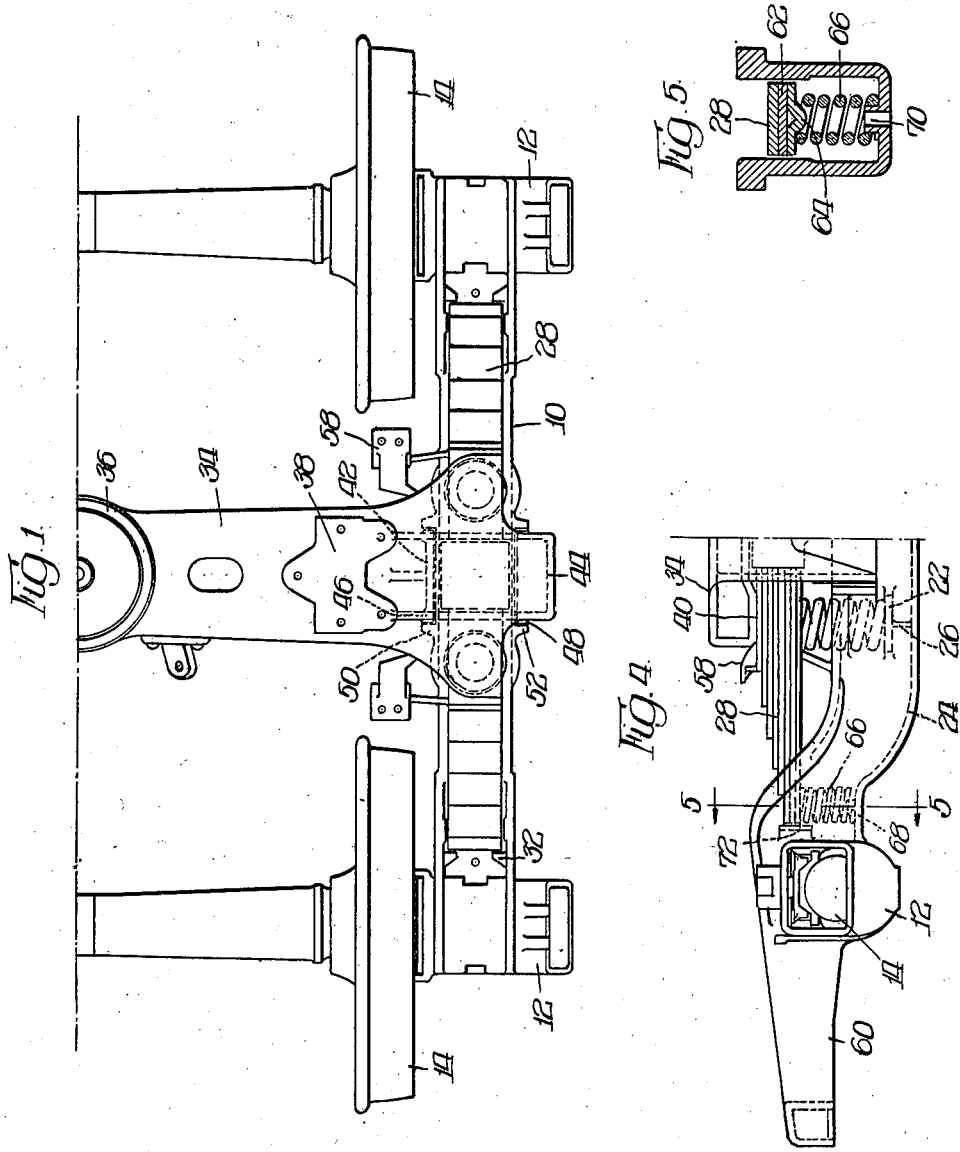
Inventor:
Howard Somervell,
By Wilkinson, Huxley, Byron & Knight
attys

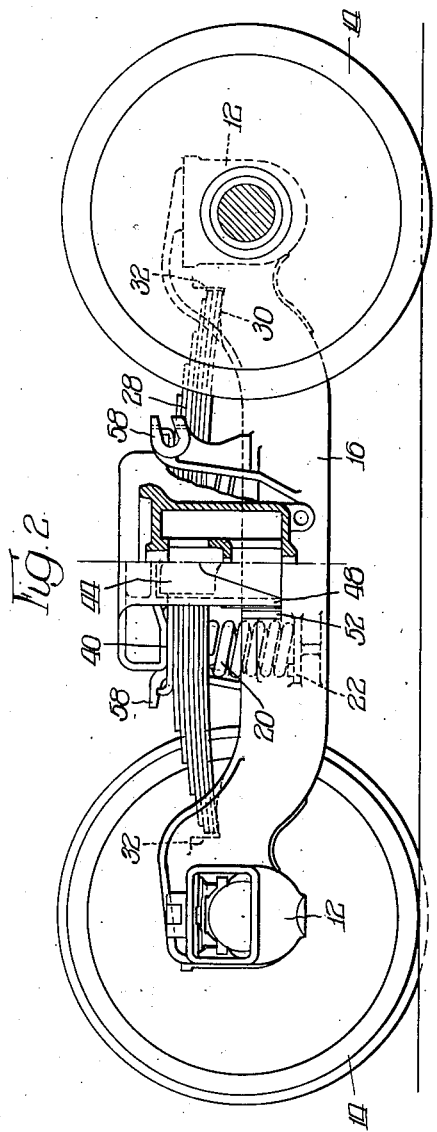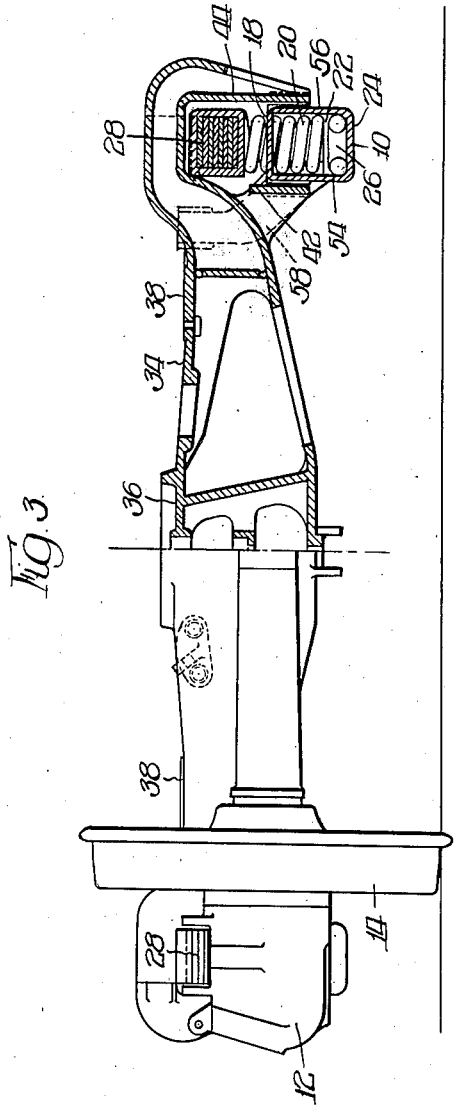

UNITED STATES PATENT OFFICE 2,048,202

TRUCK

Howard Somervell, Evanston, Ill., assignor to American Steel Foundries, Chicago, Ill., a corporation of New Jersey Application June 30, 1932, Serial No. 620,160

48 Claims. (Cl. 105—197.1)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series, the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A further object is to provide a truck construction wherein a plurality of resilient members of different character are disposed with relation to each other so that certain of the members are loaded by the other members to increase the amount of energy they will absorb.

A yet further object is to provide a truck construction wherein the load carrying member is supported on the side frame by resilient members of different characteristics and so arranged that certain of the resilient members support a greater portion of the load than other of the resilient members.

Another further object is to provide a truck construction wherein the load carrying member is carried on the side frame by means which varies its effective load transmitting length according to the imposed load.

A different object is to provide a side frame construction of great strength, rigidity and simplicity of construction and design wherein provision is made to position spring members and transmit thrusts therefrom to the side frame.

A still different object is to provide a rigid truck construction embodying each or any of the above advantages and wherein brake supporting means is disposed to permit the application of the truck to cars adapted for use in dumping machines and the like.

Another different object is to provide a truck construction wherein higher springs may be provided, or wherein normal height springs are provided with a low bolster.

Still another different object is to provide a truck construction wherein springs of different character are provided, one of which serves to increase the frictional absorption of the other and wherein there is a direct drive between the load carrying member and the side frame.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a fragmentary sectional side elevation of the truck construction shown in Figure 1, the section being taken substantially on the longitudinal center line of the truck;

Figure 3 is a fragmentary sectional end elevation of the truck construction shown in Figures 1 and 2, the section being taken substantially in the plane of the transverse center line of the truck;

Figure 4 is a fragmentary side elevation of a modified form of truck construction;

Figure 5 is an enlarged transverse sectional elevation through the spring support in the construction shown in Figure 4, the same being taken substantially in the plane as indicated by the line 5—5 of Figure 4.

Referring first of all more particularly to the construction shown in Figures 1, 2, and 3, the truck side frame 10 is provided with journal means such as the journal boxes 12 having cooperative engagement with the journal ends of the wheel and axle assemblies 14. The side frame is substantially of box section, being slightly depressed intermediate the journal boxes as at 16, the upper chord 18 thereof being provided with spaced apertures for the reception of the spaced coil springs 20. A coil spring seat 22 is provided in way of these apertures and spaced from the lower chord 24 of the side frame, suitable reenforcing means 26 being provided between the lower chord and the seat members. The coil springs are disposed between the seats 22 and the semi-elliptic leaf spring assembly 28, the ends of said assembly being seated on the seats 30 disposed adjacent the journal boxes, and the upper leaf being flanged adjacent the ends for accommodating a shim. The seats 30 are preferably arcuate or convexed upwardly whereby deflection of the leaf spring will shorten the effective support of the springs. That is to say, the seats for the elliptic springs are so arranged that when a light load is applied to the springs, the distance between the supporting points thereof will be greater than when a heavy load is applied. It may therefore be said that the convexedly shaped seats for the leaf spring automatically shorten the span, and the load carrying capacity thereof is increased as the weight to be supported is increased.

End walls 32 are preferably provided for taking the thrust of the semi-elliptic springs. The bolster 34 is provided with the usual center bearing 36 and the side bearings 38, said bolster being adapted to be supported directly on the leaf springs 28 through the spaced seats 40, said seats being preferably located in vertical alignment with the coil springs 20 whereby the coil springs and the seats 40 serve to pinch the leaves of the leaf spring assembly more tightly together whereby the frictional absorption therebetween is increased.

The bolster is provided with the spaced depending inner and outer column members 42 and 44 in the nature of jaws or a yoke, said column members extending downwardly and embracing the side webs of the side frame. The members 42 and 44 are provided with column guide co-operating members 46 and 48 forming jaws at each end of the bolster which have sliding cooperation with the column guides 50 and 52 provided on the inner and outer webs 54 and 56 of the side frame 10, preferably intermediate the springs 20. The side frames adjacent the column guides are provided with the brake hanger brackets 58 disposed adjacent the wheels, it being understood that said brake hanger brackets can be provided on the bolster and also end hanger brackets may be provided on the side frame for use with clasp brakes, such as particularly shown in Figure 4, though of course the side frame shown in Figure 4 may be constructed as shown in Figure 1.

The construction shown in Figures 4 and 5 differs from that illustrated in Figures 1, 2, and 3 only in that end brake hanger brackets 60 are provided extending beyond the journal boxes 12, being adapted to accommodate brake hangers for clasp brakes disposed on the outside of the wheel of the cooperating wheel and axle assembly. Instead of supporting the end of the leaf spring 28 on the seat 30, the ends 62 of the leaf spring 28 are provided with the upset portion forming the dowel 64 for positioning engagement with the coil spring 66. The coil spring 66 is seated on the coil spring seat 68 disposed on the lower chord 24 of the side frame, the upstanding positioning dowel 70 being preferably provided. The seat, therefore, is disposed between the webs of the side frame whereby the coil spring 66 in the end of the leaf spring is pocketed. A suitable end wall 72 is provided adjacent the journal box and adjacent the ends of the leaf springs 28 for accommodating the end thrust thereof.

With trucks such as illustrated herein, a low center of gravity truck is provided which is decidedly advantageous for use with freight cars such as tank cars, and in high speed train work where it is desired to dispose the entire center of gravity of the vehicle as near as possible to the rails. This is provided in applicant's trucks, and the spring disposition with the low center of gravity gives a truck of very desirable riding qualities. In modifications such as shown particularly in Figure 4, the springs are disposed both in series-parallel and in series. The operation of the intermediate springs serves to increase the frictional absorption of the leaf spring, whereas the end spring 66 acting in series with the spring 28 and being a spring of different character, one tends to dampen the vibrations of the other.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of a side frame including spaced journal boxes, a single beam member connecting said journal boxes and provided with spring seats adjacent said boxes, a longitudinally arranged semi-elliptic leaf spring having the ends thereof supported on said seats through coil springs, spaced coil springs supported on said side frame and engaging said leaf spring, and a load carrying member supported on said leaf spring at points substantially in alignment with said second named coil springs.

2. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a load carrying member supported on said leaf spring at points substantially in alignment with said coil springs, and guide means provided on said load carrying member cooperating with said side frame inwardly and outwardly thereof.

3. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a load carrying member supported on said leaf spring at points substantially in alignment with said coil springs, said coil springs being supported on said side frame on seats disposed intermediate the top and bottom of said side frame.

4. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a load carrying member supported on said leaf spring at points substantially in alignment with said coil springs, said coil springs being supported on said side frame on seats disposed below the top of said side frame.

5. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a load carrying member supported on said leaf spring at points substantially in alignment with said coil springs, said coil springs being supported on said side frame on seats disposed intermediate the top and bottom of said side frame, and cooperating guide means provided on said load carrying member and said side frame.

6. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a load carrying member supported on said leaf spring at points substantially in alignment with said coil springs, said coil springs being supported on said side frame on seats disposed below the top of said side frame, and cooperating guide means provided on said load carrying member and said side frame.

7. In a truck, the combination of a side frame including spaced journal boxes, a single beam member connecting said journal boxes and provided with spring seats adjacent said boxes, a longitudinally arranged semi-elliptic leaf spring having the ends thereof disposed adjacent said seats, spaced coil springs supported on said side frame and engaging said leaf spring, a load carrying member supported on said leaf spring at points substantially in alignment with said coil springs, cooperating guide means provided on said load carrying member and said side frame, and coil springs interposed between the ends of said leaf spring and said seats.

8. In a truck, the combination of a side frame including spaced journal boxes, a single beam member connecting said journal boxes and provided with spring seats adjacent said boxes, a longitudinally arranged semi-elliptic leaf spring having the ends thereof disposed adjacent said seats, spaced coil springs supported on said side frame and engaging said leaf spring, a load carrying member supported on said leaf spring at points substantially in alignment with said coil springs, said coil springs being supported on said side frame on seats disposed intermediate the top and bottom of said side frame, and coil springs interposed between the ends of said leaf spring and said first-named spring seats.

9. In a truck, the combination of a side frame including spaced journal boxes, a single beam member connecting said journal boxes and provided with spring seats adjacent said boxes, a longitudinally arranged semi-elliptic leaf spring having the ends thereof disposed adjacent said seats, spaced coil springs supported on said side frame and engaging said leaf spring, a load carrying member supported on said leaf spring at points substantially in alignment with said coil springs, said coil springs being supported on said side frame on seats disposed below the top of said side frame, and coil springs interposed between the ends of said leaf spring and said first-named spring seats.

10. In a truck, the combination of a side frame including spaced journal boxes, a single beam member connecting said journal boxes and provided with spring seats adjacent said boxes, a longitudinally arranged semi-elliptic leaf spring having the ends thereof disposed adjacent said seats, spaced coil springs supported on said side frame and engaging said leaf spring, a load carrying member supported on said leaf spring at points substantially in alignment with said coil springs, said coil springs being supported on said side frame on seats disposed intermediate the top and bottom of said side frame, cooperating guide means provided on said load carrying member and said side frame, and coil springs interposed between the ends of said leaf spring and said first-named spring seats.

11. In a truck, the combination of a side frame including spaced journal boxes, a single beam member connecting said journal boxes and provided with spring seats adjacent said boxes, a longitudinally arranged semi-elliptic leaf spring having the ends thereof disposed adjacent said seats, spaced coil springs supported on said side frame and engaging said leaf spring, a load carrying member supported on said leaf spring at points substantially in alignment with said coil springs, said coil springs being supported on said side frame on seats disposed below the top of said side frame, cooperating guide means provided on said load carrying member and said side frame, and coil springs interposed between the ends of said leaf spring and said first-named spring seats.

12. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a load carrying member supported on said leaf spring at points substantially in alignment with said coil springs, said coil springs being supported in pockets provided in said side frame.

13. In a truck, the combination of a side frame including spaced journal boxes, a single beam member connecting said journal boxes and provided with spring seats adjacent said boxes, a longitudinally arranged semi-elliptic leaf spring having the ends thereof disposed adjacent said seats, spaced coil springs supported on said side frame and engaging said leaf spring, a bolster supported on said leaf spring at points substantially in alignment with said coil springs, and coil springs interposed between the ends of said leaf spring and said seats.

14. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a bolster supported on said leaf spring at points substantially in alignment with said coil springs, and guide means provided on said bolster and said side frame and cooperating inwardly and outwardly of said side frame.

15. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a load carrying member supported on said leaf spring at points substantially in alignment with said coil springs, said load carrying member having column portions embracing said leaf spring and having sliding cooperation with guide means on said side frame.

16. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a bolster supported on said leaf spring at points substantially in alignment with said coil springs, said bolster having column portions embracing said leaf spring and having sliding cooperation with guide means on said side frame.

17. In a truck, the combination of a side frame including spaced journal boxes, a single beam member connecting said journal boxes and provided with spring seats adjacent said boxes, a longitudinally arranged semi-elliptic leaf spring having the ends thereof disposed adjacent said seats, spaced coil springs supported on said side frame and engaging said leaf spring, a load carrying member supported on said leaf spring at points substantially in alignment with said coil springs, said load carrying member having column portions embracing said leaf spring and having sliding cooperation with guide means on said side frame, and coil springs interposed between the ends of said leaf spring and said seats.

18. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a load carrying member supported on said leaf spring at points substantially in alignment with said coil springs, said load carrying member having column means having sliding cooperation with guide means inwardly and outwardly of said side frame.

19. In a truck, the combination of a side frame including spaced journal boxes, a single beam member connecting said journal boxes and provided with spring seats adjacent said boxes, a longitudinally arranged semi-elliptic leaf spring having the ends thereof seated on said seats, spaced coil springs supported on said side frame and engaging said leaf spring, a bolster supported on said leaf spring at points substantially in alignment with said coil springs, said bolster having column means having sliding cooperation with guide means inwardly and outwardly of said side frame.

20. In a truck, the combination of spaced wheel and axle assemblies, a side frame extending therebetween and comprising a single beam member, a longitudinally arranged semi-elliptic leaf spring having its ends supported by said side frame adjacent said assemblies, a load carrying member supported by said leaf spring, and spaced coil springs between said leaf spring and side frame and cooperating with said leaf spring to increase the frictional absorption thereof, said coil springs being supported below the top of said side frame.

21. In a truck, the combination of spaced wheel and axle assemblies, a side frame extending therebetween and comprising a single beam member, a longitudinally arranged semi-elliptic leaf spring having its ends supported by said side frame adjacent said assemblies, a load carrying member supported by and embracing said leaf spring, the part of said load carrying member embracing said leaf spring having cooperating guiding relation with said side frame, and spaced coil springs between said leaf spring and side frame and cooperating with said leaf spring to increase the frictional absorption thereof.

22. In a truck, the combination of spaced wheel and axle assemblies, a side frame extending therebetween and comprising a single beam member, a longitudinally arranged semi-elliptic leaf spring having its ends supported by said side frame adjacent said assemblies, a load carrying member supported by and embracing said leaf spring, spaced coil springs between said leaf spring and side frame and cooperating with said leaf spring to increase the frictional absorption thereof, the part of said load carrying member embracing said leaf spring having guiding relation with said side frame.

23. In a truck, the combination of spaced wheel and axle assemblies, a side frame extending therebetween and comprising a single beam member provided with spring seats adjacent said assemblies, a longitudinally arranged semi-elliptic leaf spring having the ends thereof seated on said seats, a load carrying member supported by said leaf spring and having cooperating guiding relation inwardly and outwardly of said side frame, and spaced coil springs disposed between said leaf spring and side frame.

24. In a truck, the combination of spaced wheel and axle assemblies, a side frame extending therebetween and comprising a single beam member, a longitudinally arranged semi-elliptic leaf spring, coil springs between said side frame and leaf spring for support of the ends thereof adjacent said assemblies, a load carrying member supported by said leaf spring, and spaced coil springs disposed between said leaf spring and side frame intermediate said first-named coil springs.

25. In a truck, the combination of spaced wheel and axle assemblies, a side frame extending therebetween and comprising a single beam member, a longitudinally arranged semi-elliptic leaf spring, coil springs between said side frame and leaf spring for support of the ends thereof adjacent said assemblies, a load carrying member supported by said leaf spring and having cooperating guiding relation with said side frame, and spaced coil springs disposed between said leaf spring and side frame intermediate said first-named coil springs.

26. In a truck, the combination of spaced wheel and axle assemblies, a side frame, a longitudinally arranged semi-elliptic leaf spring, coil springs between said side frame and leaf spring for support of the ends thereof adjacent said assemblies, a load carrying member supported by said leaf spring, and spaced coil springs disposed between said leaf spring and side frame intermediate said first-named coil springs.

27. In a truck, the combination of spaced wheel and axle assemblies, a side frame, a longitudinally arranged semi-elliptic leaf spring, coil springs between said side frame and leaf spring for support of the ends thereof adjacent said assemblies, a load carrying member supported by said leaf spring and having cooperating guiding relation with said side frame, and spaced coil springs disposed between said leaf spring and side frame intermediate said first-named coil springs.

28. In a truck, the combination of spaced wheel and axle assemblies, a side frame extending therebetween and comprising a single beam member, a longitudinally arranged semi-elliptic leaf spring having its ends supported by said side frame adjacent said assemblies, a load carrying member supported by said leaf spring, and spaced coil springs between said leaf spring and side frame, said load carrying member having column portions embracing said leaf spring and having sliding cooperation with guide means on said side frame.

29. A side frame including a single beam member of integral construction having spaced journal boxes, said beam member being depressed intermediate the ends thereof and having spaced webs connected together by upper and lower chords, seats disposed on the lower chords of said beam member adjacent the journal boxes, and intermediate seats disposed between the upper and lower chords of said beam member, said seats being disposed in way of apertures provided in said upper chord.

30. A side frame including a single beam member of integral construction having spaced journal boxes, said beam member being depressed intermediate the ends thereof and having spaced webs connected together by upper and lower chords, seats disposed on said beam member adjacent the journal boxes, and intermediate seats disposed between the upper and lower chords of said beam member, said seats being disposed in way of apertures in said upper chord.

31. A side frame including a single beam member of integral construction having spaced journal boxes and having spaced webs connected together by upper and lower chords, said beam member being depressed intermediate the ends thereof, seats disposed on the lower chord of said beam member adjacent the journal boxes, and intermediate seats disposed on said beam member, said seats being disposed in way of apertures provided in said upper chord.

32. A side frame including a single beam member of integral construction having spaced journal boxes and having spaced webs connected together by upper and lower chords, said beam member being depressed intermediate the ends thereof, seats disposed on the lower chord of said beam member adjacent the journal boxes, and intermediate seats disposed below the upper chord of said beam member, said seats being disposed in way of apertures provided in said upper chord.

33. A side frame including a single beam member of integral construction having spaced journal boxes, said beam member being depressed intermediate the ends thereof and having spaced webs connected together by upper and lower chords, seats disposed on said beam member adjacent the journal boxes, and intermediate seats disposed below the upper chord of said beam member, said seats being disposed in way of apertures provided in said upper chord.

34. A side frame including a single beam member of integral construction having spaced journal boxes, said beam member being depressed intermediate the ends thereof and having spaced webs connected together by upper and lower chords, spring seats disposed on the lower chord of said beam member adjacent the journal boxes, intermediate spring seats disposed between the upper and lower chords of said beam member, and a thrust member disposed adjacent one of said spring seats, said seats being disposed in way of apertures provided in said upper chord.

35. A side frame including a single beam member of integral construction having spaced journal boxes, said beam member being depressed intermediate the ends thereof and having spaced webs connected together by upper and lower chords, spring seats disposed on said beam member adjacent the journal boxes, intermediate spring seats disposed between the upper and lower chords of said beam member, and a thrust member disposed adjacent one of said spring seats, said seats being disposed in way of apertures provided in said upper chord.

36. A side frame including a single beam member of integral construction having spaced journal boxes, said beam member being depressed intermediate the ends thereof and having spaced webs connected together by upper and lower chords, spring seats disposed on the lower chord of said beam member adjacent the journal boxes, intermediate spring seats disposed on said beam member, and a thrust member disposed adjacent one of said spring seats, said seats being disposed in way of apertures provided in said upper chord.

37. A side frame including a single beam member of integral construction having spaced journal boxes, said beam member being depressed intermediate the ends thereof and having spaced webs connected together by upper and lower chords, spring seats disposed on the lower chord of said beam member adjacent the journal boxes, intermediate spring seats disposed below the upper chord of said beam member, and a thrust member disposed adjacent one of said spring seats, said seats being disposed in way of apertures provided in said upper chord.

38. A side frame including a single beam member of integral construction having spaced journal boxes, said beam member being depressed intermediate the ends thereof and having spaced webs connected together by upper and lower chords, spring seats disposed on said beam member adjacent the journal boxes, intermediate spring seats disposed below the upper chord of said beam member and a thrust member disposed adjacent one of said spring seats, said seats being disposed in way of apertures provided in said upper chord.

39. A side frame including a single beam member of integral construction having spaced journal boxes, said beam member being depressed intermediate the ends thereof and having spaced webs connected together by upper and lower chords, spring seats disposed on the lower chord of said beam member adjacent the journal boxes, intermediate spring seats disposed between the upper and lower chords of said beam member, said seats being disposed in way of apertures provided in said upper chord, and brake rigging brackets disposed on said beam member adjacent certain of said spring seats.

40. A side frame including a single beam member of integral construction having spaced journal boxes, said beam member being depressed intermediate the ends thereof and having spaced webs connected together by upper and lower chords, spring seats disposed on the lower chord of said beam member adjacent the journal boxes, intermediate spring seats disposed between the upper and lower chords of said beam member, said seats being disposed in way of apertures provided in said upper chord, and brake rigging brackets disposed on said beam member adjacent said intermediate spring seats.

41. A side frame including a single beam member of integral construction having spaced journal boxes, said beam member being depressed intermediate the ends thereof and having spaced webs connected together by upper and lower chords, seats disposed on the lower chord of said beam member adjacent the journal boxes, intermediate seats disposed between the upper and lower chords of said beam member, said seats being disposed in way of apertures provided in said upper chord, and brake rigging brackets disposed on said beam member adjacent said journal boxes.

42. A side frame including a single beam member of integral construction having spaced journal boxes, said beam member being depressed intermediate the ends thereof and having spaced webs connected together by upper and lower chords, seats disposed on the lower chord of said beam member adjacent the journal boxes, intermediate seats disposed between the upper and lower chords of said beam member, said seats being disposed in way of apertures provided in said upper chord, and brake rigging brackets disposed on said beam member adjacent said journal boxes and said intermediate seats.

43. A side frame including a single beam member of integral construction having spaced journal boxes, said beam member being depressed intermediate the ends thereof and having spaced webs connected together by upper and lower chords, seats disposed on the lower chord of said beam member adjacent the journal boxes, intermediate seats disposed between the upper and lower chords of said beam member, said seats being disposed in way of apertures provided in said upper chord, and guide means for an associated load carrying member disposed on said beam member adjacent certain of said seats.

44. A side frame including a single beam member having spaced journal boxes, said beam member being depressed intermediate the ends thereof and being provided with upper and lower chords, seats disposed on the lower chord of said beam member adjacent the journal boxes, intermediate seats disposed between the upper and lower chords of said beam member, and guide means for an associated load carrying member disposed on said beam member adjacent said intermediate seats.

45. In a load carrying member, the combination of a body portion having upper and lower chords, an end portion formed by extensions of said upper and lower chords, said end portion having spaced spring seats on the lower chord thereof, and spaced depending guide members defining an opening disposed transversely with respect to said body portion to receive an associated side frame and adapted to have sliding cooperation with column guides on an associated side frame.

46. In a load carrying member, the combination of a body portion having upper and lower chords, an end portion formed by extensions of said upper and lower chords, said end portion having spaced spring seats on the lower chord thereof and spaced depending guide members defining an opening disposed transversely with respect to said body portion to receive an associated side frame and adapted to have sliding cooperation with column guides on said associated side frame and with said side frame.

47. In a bolster, the combination of a body portion having upper and lower chords, the upper of said chords having center and side bearings, an end portion formed by extensions of said upper and lower chords, said end portion having spaced spring seats on the lower chord thereof and spaced depending guide members defining an opening disposed transversely with respect to said body portion to receive an associated side frame and adapted to have sliding cooperation with column guides on said associated side frame.

48. In a bolster, the combination of a body portion having upper and lower chords, the upper of said chords having center and side bearings, an end portion formed by extensions of said upper and lower chords, said end portion having spaced spring seats on the lower chord thereof and spaced depending guide members defining an opening disposed transversely with respect to said body portion to receive an associated side frame and adapted to have sliding cooperation with column guides on said associated side frame and with said side frame.

HOWARD SOMERVELL.

CERTIFICATE OF CORRECTION.

Patent No. 2,048,202. July 21, 1936.

HOWARD SOMERVELL.

It is hereby certified that error appears in the printed specification of the above numbered patent requiring correction as follows: Page 2, second column, line 39, for "freight" read flat; page 5, first column, line 75, claim 30, after "apertures" insert provided; and that the said Letters Patent should be read with these corrections therein that the same may conform to the record of the case in the Patent Office.

Signed and sealed this 20th day of October, A. D. 1936.

Leslie Frezer (Seal) Acting Commissioner of Patents.